(12) United States Patent
Campbell et al.

(10) Patent No.: US 7,456,517 B2
(45) Date of Patent: Nov. 25, 2008

(54) METHODS AND APPARATUS FOR CONTROLLED SOLID OXIDE FUEL CELL (SOFC)/TURBINE HYBRID POWER GENERATION

(75) Inventors: Anthony Bruce Campbell, San Pedro, CA (US); Craig Steven Smugeresky, Newport Beach, CA (US)

(73) Assignee: General Electric Company, Schenectady, NY (US)

( * ) Notice: Subject to any disclaimer, the term of this patent is extended or adjusted under 35 U.S.C. 154(b) by 822 days.

(21) Appl. No.: 11/104,367

(22) Filed: Apr. 12, 2005

(65) Prior Publication Data

US 2006/0228596 A1    Oct. 12, 2006

(51) Int. Cl.
*H02J 1/10* (2006.01)
(52) U.S. Cl. ............................. 307/53; 429/13; 429/23
(58) Field of Classification Search .................... 307/53
See application file for complete search history.

(56) References Cited

U.S. PATENT DOCUMENTS

| | | | |
|---|---|---|---|
| 5,532,573 A | 7/1996 | Brown et al. | |
| 5,678,647 A | 10/1997 | Wolfe et al. | |
| 5,968,680 A | 10/1999 | Wolfe et al. | |
| 6,213,234 B1 | 4/2001 | Rosen et al. | |
| 6,230,494 B1 | 5/2001 | Botti et al. | |
| 6,607,855 B2 | 8/2003 | Ueda et al. | |
| 6,609,582 B1 | 8/2003 | Botti et al. | |
| 2002/0037443 A1 | 3/2002 | Christen et al. | |
| 2002/0163819 A1 | 11/2002 | Treece | |
| 2003/0175566 A1 | 9/2003 | Fisher et al. | |
| 2003/0218385 A1 | 11/2003 | Bronicki | |
| 2003/0224231 A1 | 12/2003 | Penev | |
| 2004/0124308 A1 | 7/2004 | Daggett | |
| 2005/0006957 A1 | 1/2005 | Bronicki | |
| 2006/0010866 A1* | 1/2006 | Rehg et al. ................. | 60/641.8 |

FOREIGN PATENT DOCUMENTS

| | | |
|---|---|---|
| EP | 1 194 969 B1 | 10/2003 |
| WO | WO 01/06589 A1 | 1/2001 |
| WO | WO 03/063276 A2 | 7/2003 |

* cited by examiner

*Primary Examiner*—Robert L. Deberadinis
(74) *Attorney, Agent, or Firm*—Armstrong Teasdale LLP

(57) ABSTRACT

A method for operating a pressurized solid oxide fuel cell/turbine (SOFC/turbine) hybrid power generation system in which the hybrid power generation system includes an SOFC generator and a turbine generator includes controlling airflow to the SOFC/turbine hybrid power generation system in accordance with power demand and utilizing electrical current drawn from the SOFC generator to regulate SOFC generator temperature.

20 Claims, 2 Drawing Sheets

METHODS AND APPARATUS FOR CONTROLLED SOLID OXIDE FUEL CELL (SOFC)/TURBINE HYBRID POWER GENERATION

BACKGROUND OF THE INVENTION

This invention relates generally to methods and apparatus for controlled power generation, and more particularly to methods and apparatus for controlled fuel cell/turbine hybrid power generation At least one known power system integrates a solid oxide fuel cell (SOFC) generator, which can comprise a single cell or a stack of cells, an unreacted fuel combustor that can be integrated into the SOFC generator or provided as a stand-alone device, and a turbine generator. Such pressurized SOFC/turbine hybrid power generation systems provide high electrical efficiency combined with low emissions. The turbine, which can be a micro-turbine (MT) or gas turbine (GT), serves both to pressurize and provide air to the SOFC generator while the SOFC generator provides heat energy to operate the MT/GT generator. The power output of the plant comprising the combination of the SOFC generator and the MT/GT generator is the combined sum of the SOFC and MT/GT generator electrical outputs.

The SOFC and the MT/GT generators are highly coupled thermally and operationally. Although several strategies for controlling the heat balance of fuel cells and fuel cell generators are known, this coupling has made it difficult to apply these strategies in SOFC/turbine hybrid power generation systems. Further complicating the control of these power generation systems is the fact that the outputs of the generators must also be shared in a way that allows the following of a demanded load. These control requirements must be met at all times and must respond to outside disturbances and local transients.

BRIEF DESCRIPTION OF THE INVENTION

There is therefore provided, in some configurations of the present invention, a method for operating a pressurized solid oxide fuel cell/turbine (SOFC/turbine) hybrid power generation system in which the hybrid power generation system includes an SOFC generator and a turbine generator. The method includes controlling airflow to the SOFC/turbine hybrid power generation system in accordance with power demand and utilizing electrical current drawn from the SOFC generator to regulate SOFC generator temperature.

Some configurations of the present invention provide a power generation system that includes an SOFC hybrid plant having a pressurized SOFC generator, an unreacted fuel combustor, and a turbine generator. The SOFC and turbine generator are configured to provide a summed power output of the SOFT hybrid plant. Also provided is a system controller configured to meet load requirements of the SOFC hybrid plant while maintaining temperature constraints on the SOFC generator and the unreacted fuel combustor.

Also, some configurations of the present invention provide a system controller for a hybrid power plant that has an SOFC generator, a turbine generator, and an unreacted fuel combustor. The system controller is configured to cool the SOFC generator to maintain a predetermined SOFC temperature setpoint and to maintain a surge margin during airflow changes of the turbine generator.

It will be appreciated that various configurations of the present invention provide controlled, coordinated operation of a SOFC and a turbine generator to follow a demanded load while also providing satisfactory thermal management.

DETAILED DESCRIPTION OF THE INVENTION

Figure 1:
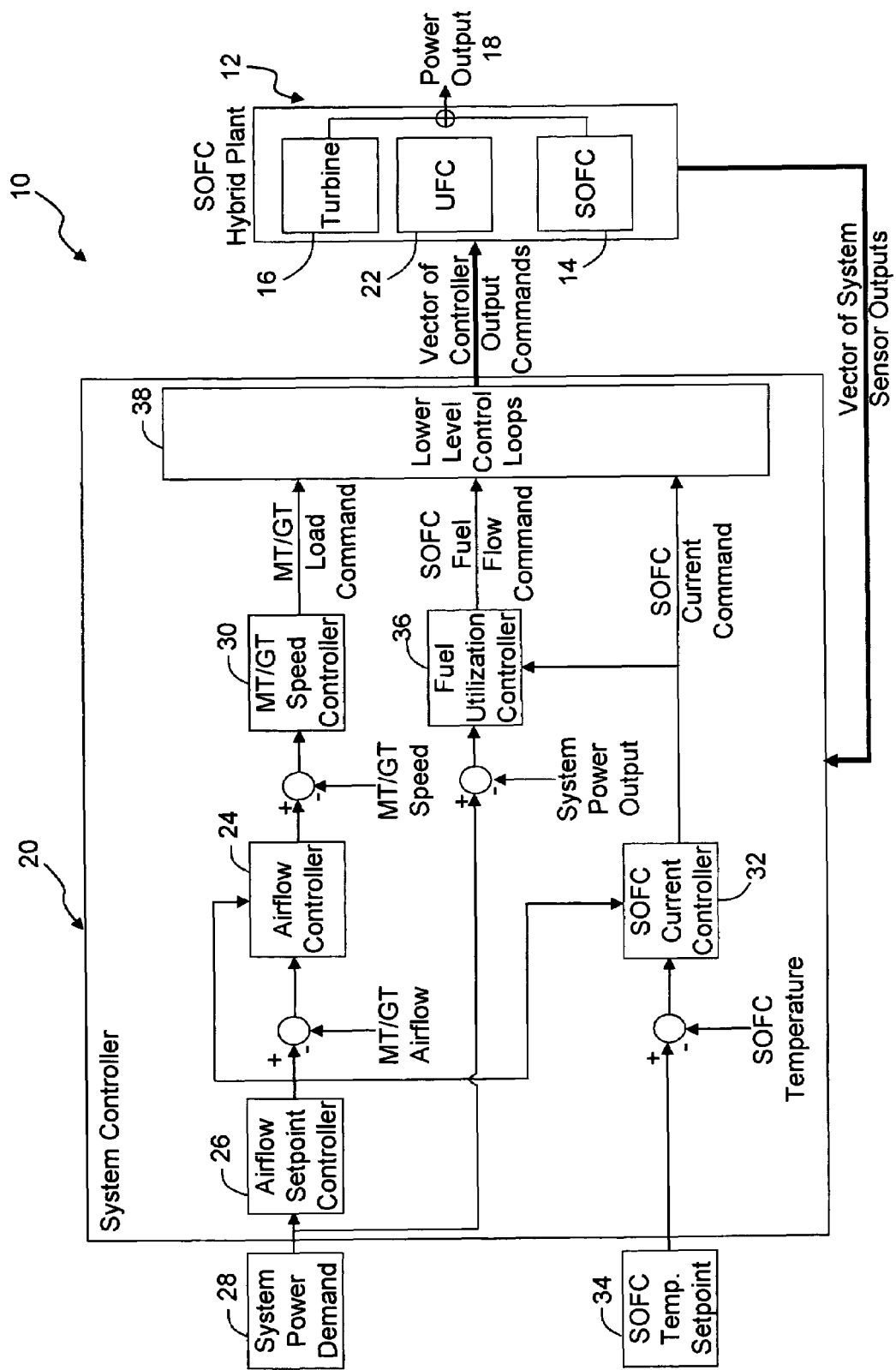
FIG. 1 is a block diagram representative of a configuration of a power generation system of the present invention.

In some configurations of the present invention and referring to FIG. 1, a solid oxide fuel cell (SOFC)/turbine hybrid power generation system 10 is provided in which control of both solid oxide fuel cell (SOFC) generator 14 temperature and total power system electrical power are provided simultaneously. In these configurations, hybrid power generation system 10 is able to follow a demanded electrical power output 28 while providing control of system thermal management and efficiency.

In some configurations of the present invention, a pressurized SOFC/turbine power generation system 10 integrates a solid oxide fuel cell generator 14 with a turbine generator that includes a turbine generator 16 such as a micro-turbine (MT) or gas turbine (GT) in a hybridized power plant 12 that achieves high electrical efficiency combined with low emissions. Turbine 16 serves both to pressurize and provide air to SOFC generator 14 while the latter provides heat energy to operate turbine generator 16. SOFC generator 14 and turbine generator 16 are highly coupled thermally and operationally. Thus, a system controller 20 that implements a control strategy is provided in some configurations of the present invention to coordinate their operation. Plant power output 18 is the combined sum of SOFC generator 14 and turbine generator 16 electrical outputs. Outputs of SOFC generator 14 and turbine generator 16 are shared in a way that allows following of a demanded load and thermal management of the hybrid power generation plant 12, which is part of hybrid power generation system 10. The control requirements are met at all times and respond to outside disturbances and load transients.

More particularly, configurations of the present invention allow pressurized SOFC/turbine hybrid power generations systems to stably follow a demanded system power setpoint 28 while maintaining key parameters within specified limits. SOFC generator 14 operates within a narrow temperature window for both reliability and efficiency. A system controller 20 is provided to balance the needs of SOFC generator 14 and the power output demanded by a customer or customers. For example, reactants, temperatures, pressure, and/or component electrical output are regulated. In some configurations, fuel flow, airflow, SOFC generator fuel utilization, MT/GT seed, MT/GT power, and/or SOFC generator current are controlled. Airflow and MT/GT generator power output are related, so that, in some configurations, the power split between SOFC generator 14 and turbine generator 16 are constrained by thermal management of SOFC generator 14. SOFC generator 14 power is a strong function of the electrical current demanded as well as fuel utilization, temperature and pressure.

System controller 20 is provided in some configurations of the present invention to successfully meet load requirements while maintaining temperature constraints on the combustion of unutilized SOFT generator 14 fuel in a combustor, such as unreacted fuel combustor (UFC) 22. In some configurations of the present invention, lower level control loops 38 are provided and are implemented by PI controllers or other suitable feedback control structures.

In some configurations and referring again to FIG. 1, an airflow controller 24 limits the response time of the system to thereby maintain sufficient MT/GT compressor surge margin during airflow changes. Airflow controller 24 is provided because of the surge margin needed for a hybrid plant 12 having the addition of large volumes for SOFC generator 14, manifolding, and other thermal management components (not shown in the Figures) placed between an MT/GT compressor discharge and an expander inlet (also not shown in the Figures). System controller 20 includes, in some configurations of the present invention:

(1) an airflow setpoint controller 26 configured to determine an airflow setpoint as a function of system power demand 28;

(2) an airflow controller 24 configured to determine (i.e., control) a turbine rotational speed dependent upon the airflow setpoint;

(3) a turbine speed controller 30 configured to determine and issue an MT/GT generator power command to thereby satisfy the required rotational speed;

(4) an SOFC generator current controller 32 configured to determine and issue a current command for SOFC generator 14, dependent upon the airflow, to thereby cool SOFC generator 14 to maintain a predetermined SOFC temperature setpoint 34;

(5) a fuel utilization controller 36 configured to determine a fuel flow, dependent upon the current demand, to meet a desired fuel cell power, while maintaining temperature constraints on the combustion of unutilized SOFC generator fuel in combustor 22; and (6) lower level control loops 38 configured to regulate lower level control functions such as the control of temperature bypass valves, fuel control valves, power electronics, etc.

Airflow to SOFC hybrid power generation plant 12 in some configurations is controlled using electrical current drawn from SOFC generator 14 to regulate the temperature of SOFC generator 14. The airflow is delivered according to the power demand and is mapped as a function of operating temperature.

The power output of SOFC generator 14 is the product of the electrical current drawn and SOFC generator 14 operating voltage. Thus, the voltage in some configurations of the present invention is trimmed so that that the total plant power output 18 matches the demanded power output. Fuel utilization controller 36 is used as a trim to vary the SOFC fuel flow to output the desired system power. SOFC generator 14 power trim is provided in some configurations of the present invention by varying the fuel utilization about a nominal value to either increase or decrease the operating voltage of SOFC generator 14.

Figure 2:
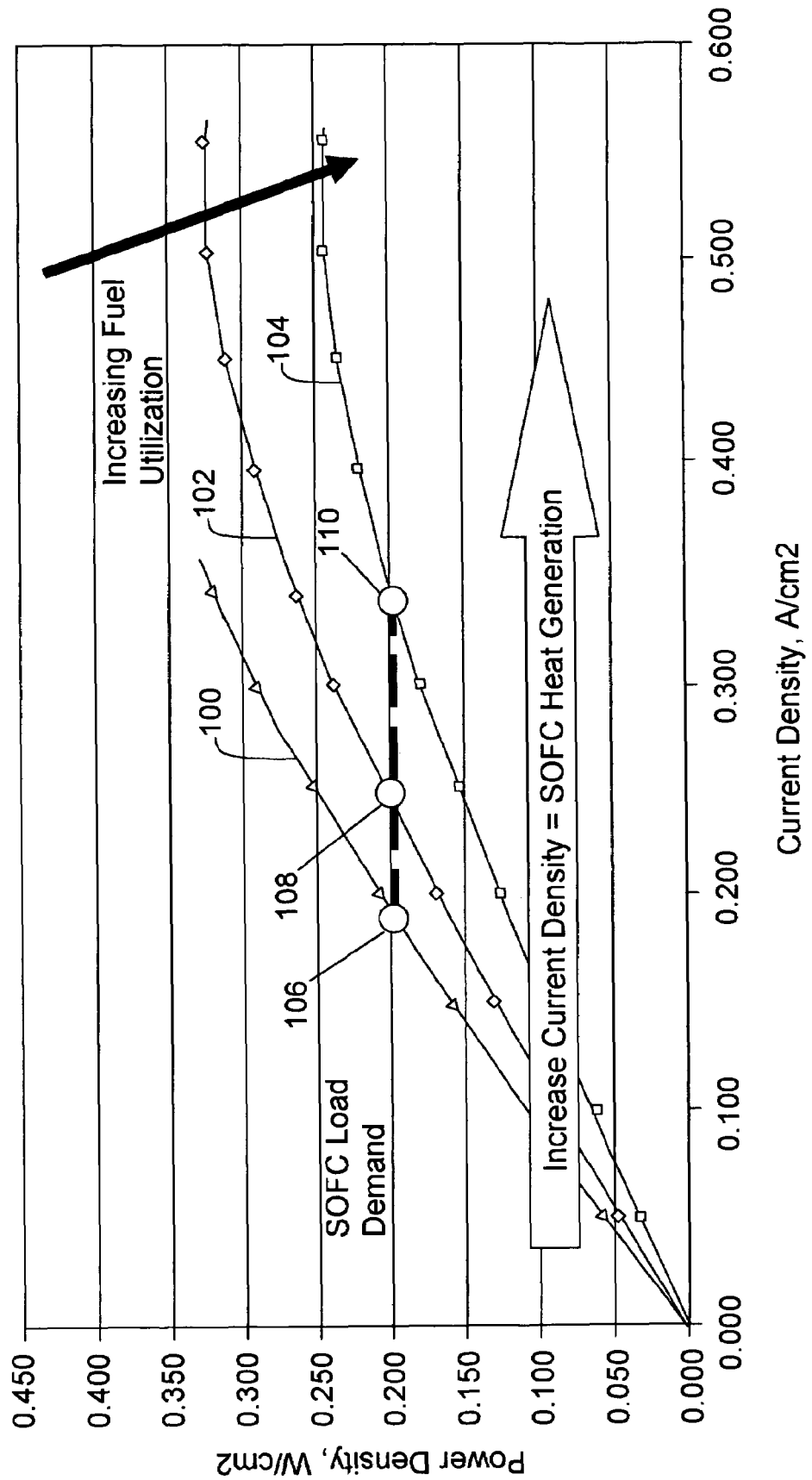
FIG. 2 is a graph showing the relationship of current density vs. power density in one power supply configuration of the present invention.

System level optimization is performed in some configurations of the preset invention. FIG. 2 is a graph of power density vs. current density, showing operating lines 100, 102, and 104 drawn for SOFC generator 14 for various fuel utilizations in one configuration of the present invention. An optimization is performed in some configurations that balances current drawn with fuel utilization to maximize, or at least increase, fuel efficiency and control temperature concurrently with the delivery of a constant power output. For example, if the represented configuration is operating at the current density and fuel utilization represented by statepoint 106, the temperature of SOFC generator 14 is increased (because heat generated by SOFC generator 14 is a strong function of current density) by moving the current density and fuel utilization setpoints to those represented by statepoint 108.

The system user will continue to receive the same amount of power as is demanded, but SOFC generator 14 will move about its performance optimization surface. If optimization requires a still higher SOFC generator 14 temperature, the current density and fuel utilization setpoints are increased to those represented by setpoint 110. By operating in this manner and continuing to move about the constant SOFC generator load demand line, the SOFC/turbine hybrid power generation system configuration represented by FIG. 1 optimizes its performance.

It will thus be appreciated that configurations of the present invention are able to follow a demanded electrical power output while providing control of system thermal management and efficiency.

While the invention has been described in terms of various specific embodiments, those skilled in the art will recognize that the invention can be practiced with modification within the spirit and scope of the claims.

What is claimed is:

1. A method for operating a pressurized solid oxide fuel cell/turbine (SOFC/turbine) hybrid power generation system comprising a solid oxide fuel cell (SOFC) generator and a turbine generator, said method comprising:
controlling airflow to the SOFC/turbine hybrid power generation system in accordance with power demand; and
utilizing electrical current drawn from the SOFC generator to regulate SOFC generator temperature.

2. A method in accordance with claim 1 wherein said controlling airflow to the SOFC/turbine hybrid generation power system further comprises controlling an airflow setpoint as a function of power demand.

3. A method in accordance with claim 2 wherein said controlling airflow to the SOFC/turbine hybrid power generation system further comprises controlling a turbine rotational speed dependent upon the airflow setpoint.

4. A method in accordance with claim 1 wherein the SOFC/turbine hybrid power generation system further comprises using electrical current drawn from the SOFC generator to control cooling of the SOFC generator to thereby maintain a predetermined SOFC temperature setpoint.

5. A method in accordance with claim 1 further comprising controlling the airflow in accordance with the power demand.

6. A method in accordance with claim 1 further comprising controlling a fuel flow, dependent upon a current demand, to meet a desired SOFC power.

7. A method in accordance with claim 1 further comprising varying SOFC fuel flow to trim output voltage so that a total plant power output matches a demanded power output.

8. A method in accordance with claim 1 wherein said controlling airflow to the SOFC/turbine hybrid power generation system in accordance with power demand further comprises controlling an airflow setpoint as a function of power demand and controlling a turbine rotational speed dependent upon the airflow setpoint and said method further comprises cooling the SOFC generator to maintain a predetermined SOFC temperature setpoint.

9. A power generation system comprising:
a solid oxide fuel cell (SOFC) hybrid plant comprising a pressurized solid oxide fuel cell (SOFC) generator, an unreacted fuel combustor, and a turbine generator, said SOFC generator and turbine generator, wherein said SOFC generator and said turbine generator are configured to provide a summed power output of said SOFC hybrid plant; and a system controller configured to meet load requirements of said SOFC hybrid plant while maintaining temperature constraints on said SOFC generator and said unreacted fuel combustor.

10. A power generation system in accordance with claim 9 wherein said system controller further comprises an airflow controller configured to limit response time of said power generation system to thereby maintain a surge margin during airflow changes of said turbine generator.

11. A power generation system in accordance with claim 10 wherein said controller further comprises an airflow setpoint controller configured to control an airflow setpoint as a function of power demand.

12. A power generation system in accordance with claim 11 wherein said system controller further comprises a turbine speed controller configured to control said turbine generator to satisfy a rotational speed requirement.

13. A power generation system in accordance with claim 9 wherein said system controller further comprises an SOFC current controller configured to control cooling of said SOFC generator to maintain a predetermined SOFC temperature setpoint.

14. A power generation system in accordance with claim 13 wherein said system controller further comprises a fuel utilization controller configured to control a fuel flow, dependent upon current demand, to meet a desired SOFC generator power.

15. A power generation system in accordance with claim 9 wherein said system controller comprises:

an airflow controller configured to limit response time of said power generation system to thereby maintain a surge margin during airflow changes of said turbine generator;

an airflow setpoint controller configured to control an airflow setpoint as a function of power demand;

a turbine speed controller configured to control said turbine generator to satisfy a rotational speed requirement;

an SOFC current controller configured to cool said SOFC generator to maintain a predetermined SOFC temperature setpoint; and a fuel utilization controller configured to control a fuel flow, dependent upon current demand, to meet a desired SOFC generator power.

16. A system controller for a hybrid power generation plant having a solid oxide fuel cell (SOFC) generator, a turbine generator, and an unreacted fuel combustor, said system controller configured to cool the SOFC generator to maintain a predetermined SOFC temperature setpoint and to maintain a surge margin during airflow changes of the turbine generator.

17. A system controller in accordance with claim 16 wherein said system controller comprises an airflow controller configured to limit a response time of the hybrid power generation plant.

18. A system controller in accordance with claim 17 wherein said system controller further comprises an airflow setpoint controller configured to control an airflow setpoint as a function of power demand.

19. A system controller in accordance with claim 18 wherein said system controller further comprises a turbine speed controller configured to control the turbine generator to satisfy a rotational speed requirement.

20. A system controller in accordance with claim 19 wherein said system controller further comprises a fuel utilization controller configured to control a fuel flow, dependent upon current demand, to meet a desired fuel cell power.

* * * * *

UNITED STATES PATENT AND TRADEMARK OFFICE
CERTIFICATE OF CORRECTION

| | | |
|---|---|---|
| PATENT NO. | : 7,456,517 B2 | Page 1 of 1 |
| APPLICATION NO. | : 11/104367 | |
| DATED | : November 25, 2008 | |
| INVENTOR(S) | : Anthony Bruce Campbell et al. | |

It is certified that error appears in the above-identified patent and that said Letters Patent is hereby corrected as shown below:

In column 1, insert the following paragraph after the Title: --This invention was made with Government support under Contract No. DE-FC26-01NT40779, awarded by the US Department of Energy (DOE). The Government has certain rights in this invention.--

Signed and Sealed this

Thirty-first Day of March, 2009

JOHN DOLL
*Acting Director of the United States Patent and Trademark Office*